Patented Nov. 9, 1926.

1,606,321

UNITED STATES PATENT OFFICE.

WINFIELD SCOTT, OF AKRON, OHIO, ASSIGNOR TO THE RUBBER SERVICE LABORATORIES CO., OF AKRON, OHIO, A CORPORATION OF OHIO.

RUBBER-VULCANIZATION ACCELERATOR.

No Drawing.    Application filed December 17, 1924.    Serial No. 756,625.

The present invention is directed to an improvement in the process of accelerating the vulcanization of rubber.

Particularly, the invention is concerned with the employment of a new type of compound for accomplishing this object.

More specifically, the invention is directed to the use as rubber vulcanization accelerators of the various polysulfids of guanidine, and particularly of its di-aryl-substituted derivatives, according to the process hereinafter set forth, in which are described methods of manufacturing and using these new compounds.

The polysulfids of guanidine and its derivatives may be most readily manufactured by reacting hydrogen sulfid upon a mixture of sulfur and the guanidine, dissolved or suspended in any suitable solvent. Thus, for example, a mixture of 210 parts of a guanidine derivative, such as di-phenyl guanidine, (or a corresponding amount of some other equivalent material) and 100 parts of sulfur, are stirred into approximately 500 parts by weight of any desirable solvent, such as alcohol. The materials both dissolve to such an extent that, when hydrogen sulfid is led into the suspension, the alcoholic solution assumes a yellowish coloration, which is followed very shortly by the precipitation of yellow crystals of the polysulfid. As the flow of hydrogen sulfid is continued, the undissolved sulfur and di-phenyl-guanidine pass into solution to react with the hydrogen sulfid until all the original mixture has been transformed into a polysulfid. It would, of course, be possible, to use sufficient solvent to dissolve all the sulfur, and di-phenyl-guanidine used, but this preferably is to be avoided, due to the possibility of a greater loss of solvent involved, and also to the loss of some of the product formed, because of its slight solubility in the solvent. The loss of the product, due to solution in the solvent employed, may be reduced by using the same solvent, saturated with the product, and recovered from one preparation, for the manufacture of successive batches of the material. An excess of hydrogen sulfid is passed through the solution or suspension, and after the reaction has been completed, the solvent is filtered off, and the crystalline product dried. The yield of the product thus obtained in a number of preparations, was found to average approximately 96% of the yield to be expected from the theory as shown by the following reaction:

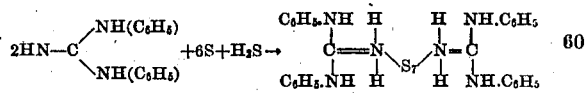

Although, in the above example, three atoms of sulfur are used for each molecule of di-phenyl-guanidine taken, it is, of course, possible to use more or less sulfur, as desired. However, of the various polysulfids prepared, it was found that the compound obtained by reacting hydrogen sulfid upon a mixture of one molecule of di-phenyl-guanidine to two atoms of sulfur seemed to be the most stable, and the most easily obtained. This compound, when prepared in the same manner as the tri-sulfid just described, is obtained in approximately a 93% yield, the slightly smaller yield being due to a greater solubility of the product in the solvent.

The polysulfids of the other guanidine derivatives, such as di-o-tolyl-guanidine, and di-m-xylyl-guanidine are readily prepared, and are all precipitated as very fine crystals when hydrogen sulfid is led into an alcoholic suspension of the proper guanidine derivative and sulfur in the manner as described. Similarly, the polysulfids of all the alkyl and aryl substituted guanidines may be prepared. It is apparent that various polysulfids of the same substituted guanidine may be obtained by varying the proportion of sulfur to guanidine taken.

Other methods of preparing my preferred type of compound, may, of course, be employed. For example, it is possible to prepare a solution of a guanidine, such as di-phenyl-guanidine, saturate this solution with hydrogen sulfid, and then dissolve the necessary quantity of sulfur in the solution, whereupon the guanidine polysulfid is formed. Or it is possible to add a solution of sodium, potassium, or ammonium or other soluble polysulfid to di-phenyl guanidine or other guanidine dissolved in a suitable solvent, and the polysulfid derivative thereof is precipitated from the solution.

All of the compounds prepared in the manner as set forth have been found to exercise a desirable accelerating action on the vulcanization of a rubber mix. Although the guanidine polysulfids may be employed to advantage as vulcanization accelerators in a number of different types of rubber compounds, the following example is given as illustrative of one means of utilizing these materials. One hundred parts of rubber, for example, the grade known to the trade as smoked sheets, 5 parts of zinc oxide, 3.5 parts of sulfur, and 0.5 parts of accelerator are compounded together in the usual manner on the rubber mixing mills, and the mix is then vulcanized, preferably under 40 pounds steam pressure per square inch, in the well known manner.

Although any of the guanidine poly-sulfids may be used in the example as shown, the advantages and characteristics of this class of accelerators are most readily illustrated by means of the following table, wherein A, B, C respectively represent rubber compositions of the type illustrated, and employ as accelerators the di-phenyl-guanidine polysulfids prepared by using 1, 2, and 3 atoms of sulfur, respectively, for each molecule of di-phenyl-guanidine taken, and then reacting the mixture with hydrogen sulfid in the manner already described.

| Time of cure at 40 lbs. steam pressure per sq. in. | Stock. | 300%. | Modulus at— | | Tensile at break. | Per cent elong. |
|---|---|---|---|---|---|---|
| | | | 500%. | 700%. | | |
| 15 minutes | A | 100 | 198 | 547 | 1570 | 952 |
| | B | 118 | 185 | 419 | 1480 | 970 |
| | C | 105 | 188 | 410 | 1588 | 1010 |
| 30 minutes | A | 139 | 396 | 1210 | 2530 | 880 |
| | B | 170 | 376 | 1020 | 2400 | 875 |
| | C | 160 | 320 | 868 | 2310 | 907 |
| 45 | A | 205 | 478 | 1595 | 2820 | 835 |
| | B | 192 | 452 | 1405 | 2760 | 865 |
| | C | 171 | 403 | 1190 | 2720 | 870 |
| 1 hour | A | 210 | 616 | 2260 | 3190 | 800 |
| | B | 214 | 582 | 2050 | 3195 | 840 |
| | C | 221 | 540 | 1595 | 2995 | 830 |

It is evident from the above table, that the polysulfids of di-phenyl-guanidine possess desirable rubber vulcanization accelerating properties. In the above tests, the most favorable results are realized after curing the mixture for a period varying from approximately 45 minutes to one hour under a steam pressure of 40 pounds per square inch. Polysulfids of other substituted guanidines, particularly those derived from di-o-tolyl-guanidine, di-m-xylyl-guanidine, as well as of other aryl-substituted guanidines, show equally valuable and desirable accelerating qualities. All of these guanidine polysulfids will withstand higher working temperatures without decomposition, are denser, and give less trouble from dusting than does di-phenyl-guanidine, when used as an accelerator of vulcanization.

I do not wholly limit my claims to the specific method of preparation of the guanidine polysulfids given, nor to definite amounts of the accelerator used in the rubber mix, or with the various compounding ingredients which may be used in the rubber mix. Nor do I limit my invention solely to the compounds mentioned, or by any theory advanced by way of explanation, or in any way except by the claims attached hereto.

When my preferred accelerators are prepared by some methods, it is possible that the polysulfids obtained may contain a sufficient quantity of free sulfur so that an additional quantity of this agent is not needed when the product is used for the manufacture of a vulcanized rubber. In other words, by imposing certain conditions in the preparation of the polysulfid, it is possible to obtain an accelerator containing enough available sulfur so that the reaction product when mixed by itself with rubber and zinc oxide and the mixture is heated under pressure, a vulcanized rubber product results.

What I claim is:—

1. The process of vulcanizing rubber which comprises heating rubber and sulfur in the presence of a compuond resulting from the union of two parts of di-phenyl-guanidine four parts of sulfur, and one part of hydrogen sulfid.

2. The process of vulcanizing rubber which comprises plasticizing rubber, mixing therewith sulphur and a small amount of di-phenyl-guanidine polysulfid and vulcanizing the mixture.

3. The process of vulcanizing rubber which comprises plasticizing rubber, mixing therewith sulphur and a small amount of di-aryl-substituted guanidine polysulfid and vulcanizing the mixture.

4. The process of vulcanizing rubber which comprises plasticizing rubber, mixing therewith sulphur and a small amount of the polysulfid of substituted guanidines and vulcanizing the mixture.

5. The process of vulcanizing rubber which comprises plasticizing rubber, mixing therewith sulphur and a small amount of guanidine polysulfid and vulcanizing the mixture.

6. The process of vulcanizing rubber which comprises plasticizing rubber, mixing therewith sulphur and a small amount of a compound obtained by passing hydrogen sulfid into a solution of di-phenyl-guanidine and sulfur and vulcanizing the mixture.

7. The process of vulcanizing rubber which comprises plasticizing rubber, mixing therewith sulphur and a small amount of a compound formed by passing hydrogen sulfid into a solution of a substituted guanidine and sulfur and vulcanizing the mixture.

8. A rubber product comprising the vulcanization product of a mixture of rubber with a vulcanizing agent and a compound resulting from the union of two parts of di-phenyl-guanidine, four parts of sulfur and one part of hydrogen sulfid.

9. A composition of matter comprising the product obtained by mixing a mixture of rubber with a vulcanizing agent and diphenyl guanidine polysulfid and vulcanizing the mixture.

10. A composition of matter comprising the product obtained by mixing a mixture of rubber with a vulcanizing agent and a diaryl-substituted guanidine polysulfid and vulcanizing the mixture.

11. A composition of matter comprising the product obtained by mixing a mixture of rubber with a vulcanizing agent and the polysulfid of a substituted guanidine and vulcanizing the mixture.

12. A composition of matter comprising the product obtained by mixing a mixture of rubber with a vulcanizing agent and guanidine polysulfid and vulcanizing the mixture.

13. A composition of matter comprising the product obtained by mixing a mixture of rubber with a vulcanizing agent and a compound obtained by passing hydrogen sulfid into a solution of di-phenyl-guanidine and sulfur and vulcanizing the mixture.

14. A composition of matter comprising the product obtained by mixing a mixture of rubber with a vulcanizing agent and a compound obtained by passing hydrogen sulfid into a solution of a substituted guanidine and sulfur and vulcanizing the mixture.

15. The process of vulcanizing rubber which comprises plasticizing rubber, mixing therewith guanidine polysulfid, and vulcanizing the mixture.

16. The process of vulcanizing rubber which comprises plasticizing rubber, mixing therewith sulphur and a small amount of a hydrogen sulfid derivative of guanidine, and vulcanizing the mixture.

17. The process of vulcanizing rubber which comprises plasticizing rubber, mixing therewith sulphur and a small amount of hydrogen sulfid derivative of di-phenyl-guanidine, and vulcanizing the mixture.

In testimony whereof I affix my signature.

WINFIELD SCOTT.